(12) United States Patent
Morelli

(10) Patent No.: US 12,139,226 B2
(45) Date of Patent: Nov. 12, 2024

(54) BICYCLE SADDLE ASSEMBLY

(71) Applicant: Angelo Morelli, Pontenure (IT)

(72) Inventor: Angelo Morelli, Pontenure (IT)

(*) Notice: Subject to any disclaimer, the term of this patent is extended or adjusted under 35 U.S.C. 154(b) by 96 days.

(21) Appl. No.: 17/924,742

(22) PCT Filed: May 10, 2021

(86) PCT No.: PCT/IB2021/053943
§ 371 (c)(1),
(2) Date: Nov. 11, 2022

(87) PCT Pub. No.: WO2021/229402
PCT Pub. Date: Nov. 18, 2021

(65) Prior Publication Data
US 2023/0182840 A1 Jun. 15, 2023

(30) Foreign Application Priority Data
May 14, 2020 (IT) .......................... 102020000011047

(51) Int. Cl.
  *B62J 1/08* (2006.01)
  *B62J 1/04* (2006.01)
(52) U.S. Cl.
  CPC .. *B62J 1/08* (2013.01); *B62J 1/04* (2013.01)
(58) Field of Classification Search
  CPC ................... B62J 1/08; B62J 1/04; B62J 1/06
  USPC ........................................ 297/195.1, 215.14
  See application file for complete search history.

(56) References Cited

U.S. PATENT DOCUMENTS

| 583,433 A | 5/1897 | Hall | |
| 7,448,664 B2* | 11/2008 | Karube | B62J 1/12 |
| | | | 297/195.1 |
| 7,478,872 B2* | 1/2009 | Lee | B62J 1/00 |
| | | | 297/202 |
| 7,562,932 B2* | 7/2009 | Chiang | B62J 1/08 |
| | | | 248/407 |
| 8,376,455 B2* | 2/2013 | Inoue | B62J 1/12 |
| | | | 297/215.15 |
| 8,905,473 B2* | 12/2014 | Hsu | B62J 1/08 |
| | | | 297/215.14 |

(Continued)

FOREIGN PATENT DOCUMENTS

| DE | 212012000284 U1 | 5/2015 | |
| EP | 3293099 A2 * | 3/2018 | ............ B62J 1/02 |

(Continued)

*Primary Examiner* — Jose V Chen
(74) *Attorney, Agent, or Firm* — Dickinson Wright PLLC; Andrew D. Dorisio

(57) ABSTRACT

A saddle assembly (10) for bicycles comprising a saddle (12) and means for stabilizing and supporting said saddle at one end (13') of a seatpost tube (13) of the bicycle, the saddle (12) comprising a hull or shield (12") defining a seat for a rider, a support frame (12') arranged supporting said saddle and comprising a sheet or leaf (12A) and means for coupling said sheet or leaf (12A) with respect to the seatpost tube (13), the coupling means comprising means for adjusting the distance of the saddle (12) with respect to a handlebar of the bicycle defined in the connection between said sheet or leaf (12A) and the coupling means and means for adjusting the inclination of the same saddle (12) with respect to a horizontal plane defined in the connection between said coupling means and the seatpost tube (13).

6 Claims, 3 Drawing Sheets

(56) References Cited

U.S. PATENT DOCUMENTS

| | | | | |
|---|---|---|---|---|
| 2005/0046247 A1* | 3/2005 | Saccucci | B62J 1/08 | 297/215.15 |
| 2007/0138846 A1* | 6/2007 | Ritchey | B62J 1/08 | 297/215.14 |
| 2007/0145794 A1* | 6/2007 | Dal Pra' | B62J 1/08 | 297/195.1 |
| 2008/0143153 A1* | 6/2008 | Lin | B62J 1/08 | 297/195.1 |
| 2010/0052377 A1* | 3/2010 | Hsu | B62J 1/08 | 297/215.14 |
| 2010/0237668 A1* | 9/2010 | Tseng | B62J 1/08 | 297/195.1 |
| 2012/0286548 A1* | 11/2012 | Bailie | B62J 1/002 | 297/195.1 |
| 2014/0035332 A1* | 2/2014 | Winefordner | B62J 1/08 | 297/195.1 |
| 2016/0368554 A1* | 12/2016 | Rizzato | B62J 1/002 | |
| 2017/0008586 A1* | 1/2017 | Danielson | B62J 15/02 | |
| 2022/0340221 A1* | 10/2022 | Press | B62H 5/006 | |
| 2023/0080662 A1* | 3/2023 | Ouyang | B62J 1/08 | 297/215.13 |
| 2023/0082720 A1* | 3/2023 | Hsu | B62J 1/08 | 297/215.16 |

FOREIGN PATENT DOCUMENTS

| | | | | |
|---|---|---|---|---|
| IT | 201800003267 A1 | 9/2019 | | |
| JP | H02145321 A | 6/1990 | | |
| WO | WO-2011160978 A1 * | 12/2011 | | B62J 1/08 |

* cited by examiner

BICYCLE SADDLE ASSEMBLY

TECHNICAL FIELD

The present invention relates to a saddle assembly for bicycles.

BACKGROUND

More in particular, the present invention relates to a perfected saddle assembly for bicycles, in particular for competition bicycles (e.g., racing bicycles, bicycles for triathlons, mountain bikes, etc.), but also suitable to be applied to so-called sports type bicycles (e.g., mountain bikes, off-road bicycles, gravel bicycles and the like) or city bicycles, electric bicycles and the like.

As is known, a traditional saddle assembly comprises a hull provided with a plane of symmetry, generally made of PVC and provided with padding and support means of said hull comprising a pair of suitably shaped metal rods, called stems, which are arranged symmetrically below the hull and on the ends of which the hull rests.

Means for fixing the saddle to the top of the seatpost, in turn, comprise a head forming the top of a tubular seatpost of the bicycles; said head is provided with clamp means adapted to grasp the stems so as to hold the saddle in place and constrained to one end of the seatpost and the other end of the seatpost is inserted into the tube-column of the bicycle frame.

The centre distance between the stems in a straight section thereof intended to be grasped by the clamp means and also the diameter of such stems are standard values for all saddles, whatever the shape and size thereof and for any manufacturer or brand, and this allows riders to change the saddle make or model as a function of specific needs or preferences while maintaining the same seatpost.

This standardization has not only conditioned the construction criteria of saddles, which all have stems of predetermined diameter and centre distance (between the straight and parallel sections of the two stems), but also the construction criteria of the seatpost necessarily provided with a head with clamp means suitable for the stems.

Furthermore, the straight section of the stems intended to be grasped by the clamp means has a length greater than that strictly necessary so as to allow to adjust, within certain limits, the position of the saddle closer/farther with respect to the handlebar of the bicycle in order to optimally adjust the pedalling position.

In the context of cycling competitions, it is known that a lighter bicycle involves less effort to use and, therefore, with the same effort made by the rider, the speed is greater with a lighter bicycle.

In light of the foregoing, the manufacturers of saddles for racing bicycles tend to make increasingly lighter saddles, even at the cost of obtaining less robust saddles.

In fact, saddle assemblies are made with saddles of very small size and which are very light, but also of reduced structural strength and therefore not suitable for riders with a heavier and more robust build who, however, tend to use them trusting in the fact that a lighter saddle ensures greater efficiency.

However, these types of saddle assemblies have serious drawbacks related to frequent breakage which can also result in more or less serious accidents; in fact, the breakage can concern both the hull (often too thin and rigid) and the stems which have thin thicknesses and are made of high-performance, light materials (for example carbon) but which are, likewise, too rigid and fragile and therefore subject to breakage, breakages which can also concern the seats (consisting of small recesses obtained in the hull) which accommodate the ends of the stems and which due to often small dimensions (in accordance with the dimensions of the rods) and even with the welded or constrained stems, give rise to a mismatch between said stems and said seats linked to the repeated stresses caused by the roughness of the ground and the like.

Another disadvantage is that the saddles supported by metal rods are vulnerable to the multiple stresses to which they are subjected and generated by the weight of the rider combined with the shocks, jolts and vibrations from a prolonged road use of the bicycle.

A further disadvantage related to traditional saddle assemblies is that, in addition to the breakage issues of the saddle hulls, also the stems (which are thin) are subject to breakage or deformation (especially in the case of falls from the bicycle) and this can also be a danger to the rider who could be injured by the broken stems.

Another drawback of the traditional saddles is the so-called "breaching" of the saddle, due to the fact that the stems, the seats thereof in the hull and the hull itself, if extensively stressed by the weight of the rider, tend to wear out and progressively yield, causing a depression in the central part of the saddle; a saddle with a "breaching" problem causes a progressive variation in the distance between the upper surface of the saddle and the axis of the pedal set, a problem which can only be solved by replacing the saddle (this is particularly negative in the case of sports competitions).

A further drawback is that the saddle assemblies described above do not allow an easy interchangeability of the hulls; this is because the interchangeability of the hulls is not allowed with the known saddle assemblies described above and the change in the type of seat involves the replacement of the entire saddle (comprising the welded rods) with a related drawback in terms of replacement times and costs.

A further disadvantage of the traditional saddles is that when they are installed on the bicycle, they must be adjusted with reference to the height with respect to the pedal, with reference to the distance of the tip of the saddle with respect to the handlebar, with reference to the inclination of the saddle with respect to the horizontal plane and of said saddle with respect to a median plane of the bicycle frame.

To try to solve the above-mentioned drawbacks, more robust saddle assemblies have been developed with reference to the hull and therefore, tending to be less prone to breaching problems; in particular, such types of saddle comprise a flat support element which is received in the hull and which has a plane of symmetry coinciding with that of said hull and with a shape which tends to correspond to the plan shape of the hull, so as to define a solid support to all the parts of the hull itself.

These support elements are provided with slots, made with an axis parallel to the plane of symmetry of the support element and serving to allow an adjustment of the longitudinal position of the hull.

However even this solution, while improved with regard to ensuring greater hull strength, has some major drawbacks linked to the fact that the support element represents a limitation on hull size and is therefore not optimally reconciled with the tendency to reduce hull size in order to lighten the hull and ensure better performance for the rider.

A further drawback, consequence of the above-mentioned drawback, is represented by a difficult interchangeability of the hulls, since not all the dimensions of the hulls adapt to the same support element and, therefore, in order to be able to adapt the saddle to the specific cycling needs of the rider, it is also necessary to replace the entire saddle assembly and this entails an increase in costs, in addition to a need to redo all the adjustments to allow an optimal and performing performance by the rider user.

A further drawback related to the use of the above plate-shaped support element is the fact that such a support element, by virtue of the function thereof, must be rigid and this rigidity does not allow any cushioning from the stresses transmitted to the rider and caused by shocks or jolts or the like linked to imperfections of the ground or soil travelled; in order to solve the above problems, the upper covering of the hull is padded in a consistent manner, but this involves both aesthetic and functional problems related to ergonomics (i.e., the ergonomic measurements of the rider serving for an optimal and dedicated saddle design, with the saddle dimensions which must be harmonized with the anatomical features of each rider).

A further disadvantage of the traditional saddle assemblies still linked to saddle ergonomics is that, in an attempt to substantially limit the weights and dimensions of said saddle assemblies, no account is taken of any problems which may arise for the rider user and which may have negative effects on the rider's bladder, prostate, genital system and the like; furthermore, such limiting measures do not take into account the anatomical differences between men and women and, in particular, do not take into account the differences in the supporting features of the ischial bones and this, obviously, leads to a not optimal pedalling and sports performance and can lead to undesirable negative consequences at the physical level.

SUMMARY

The object of the present invention is to overcome the drawbacks described above.

More in particular, the object of the present invention is to provide a saddle assembly for bicycles adapted to ensure a structural robustness and strength of the hull, avoiding the breaching problems of the hull itself.

A further object of the invention is to provide a saddle assembly for which the adjustment of the saddle position is simple and easy.

Another object of the present invention is to provide a saddle assembly which allows to meet the requests to limit the weights and dimensions of the saddle assembly.

A further object of the present invention is to provide a saddle assembly which allows to use even different saddles without the need to change the entire saddle assembly.

Another object of the present invention is to provide a saddle assembly which takes into account the physicality of the rider and which, in particular, allows the resolution of ergonomic problems related to the anatomical difference between men and women for optimal support in any condition.

A further object of the present invention is to provide users with a saddle assembly adapted to ensure high resistance, ergonomics and reliability over time and such as to be easily and economically made.

These and other objects are achieved by the invention having the features according to claim 1.

According to the invention, a saddle assembly for bicycles is provided comprising a saddle and means for stabilizing and supporting said saddle at one end of a seatpost tube of the bicycle, the saddle comprising a hull or shield defining a seat for a rider, a support frame being arranged to support said saddle and comprising a sheet or leaf and means for coupling said sheet or leaf with respect to the seatpost tube, the coupling means comprising means for adjusting the distance of the saddle with respect to a handlebar of the bicycle defined in a connection between said sheet or leaf and the coupling means and means for adjusting the inclination of the same saddle with respect to a horizontal plane defined in the connection between said coupling means and the seatpost tube.

Advantageous embodiments of the invention appear from the dependent claims.

BRIEF DESCRIPTION OF THE DRAWINGS

The constructive and functional features of the saddle assembly for bicycles of the present invention can be better understood from the following detailed description, in which reference is made to the attached drawings which represent non-limiting embodiments provided as examples, in which.

DETAILED DESCRIPTION

With reference to the aforementioned figures, the saddle assembly for bicycles of the present invention, indicated overall with 10, comprises a saddle 12, a seatpost tube 13 and a connection-support frame 12' of said saddle 12 and said seatpost tube 13.

The saddle 12 comprises a hull or shield 12" of the saddle 12 in rigid or soft material and possibly covered with a cover (the choice of the cover material is based on the specific needs of the rider) arranged to cover an upper front of the hull or shield 12" opposite the seatpost tube 13.

Any cover of the hull or shield 12", which defines the part of the saddle with which the rider comes into contact can comprise a simple surface finish in non-slip leather or, in the case of soft material, can comprise therein, between the base and leather surface finish, a layer of a conventional rubbery and soft material, of variable thickness as a function of the desired degree of softness. The hull or shield 12" is made of materials of the plastic, carbon fibre, carbon/kevlar, thermoplastic resin, titanium type or other material suitable for the purpose with features of lightness, elasticity and high structural resistance.

The support frame 12' (arranged to support said saddle 12), performs the function of a support element of the shield or hull 12" and comprises a longitudinally extended sheet or leaf 12A, of thin section thickness and having, in a vertical plane, an arcuate profile and which is stabilized to the shield or hull 12" at a front end 12B and an opposite rear end 12C of the same hull as described below, said sheet or leaf 12A having elastic properties (with an elastic behaviour of the "leaf spring" type).

Figure 3:
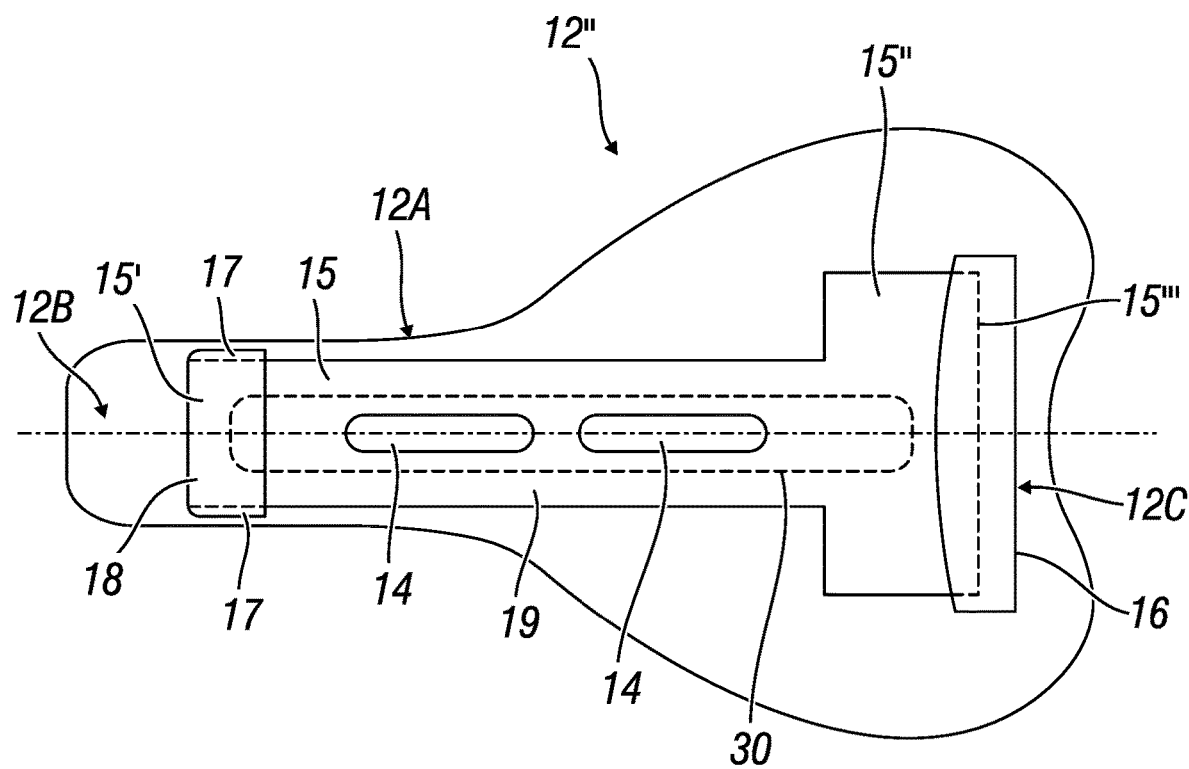
FIG. 3 schematically depicts a bottom view of a portion of the saddle assembly of the present invention.

In accordance with the preferred embodiment of the figures, the sheet or leaf 12A has a front portion 15 facing the direction of the front end 12B of the hull or shield 12" (which, as known, defines the narrowest part of the hull, as also illustrated in FIG. 3) and a rear portion 15" facing the direction of the rear end 12C (which, as known, defines the widest portion of the hull or shield with which the rider's buttocks are supported, as outlined in FIG. 3) of the same hull or shield 12".

Said sheet or leaf 12A is stabilized to the hull or shield 12", not by means of a welded connection, but with an end 15''' of the rear portion 15" which is inserted into a seat or pocket 16 formed at the rear end 12C of said hull or shield 12" and with lateral edges of the end 15' of the front portion 15 which are coupled, by sliding, with corresponding tracks 17 formed on the front end 12B of the hull or shield 12", with said front end 15' which can be constrained in position by means of a removable type plate or cover 18 (stabilized in position with a dowel or screw or with an equivalent known retaining means or, alternatively, is stabilized in position with a snap-fit or deformation type connection or similarly suitable for the purpose).

According to an alternative embodiment, the end of the front portion 15 is inserted into a seat or pocket of a type similar to the seat or pocket 16 of the rear end 12C of the shield or hull 12".

The coupling described between the shield or hull 12" and the sheet or leaf 12A makes said shield or hull 12" of the saddle 12 easily and quickly separable or removable with respect to the sheet or leaf 12A of the supporting frame 12' and replaceable with another saddle, depending on the specific needs of the rider.

Said sheet or leaf 12A comprises, at a central portion 19 intermediate between the front portion 15 and the rear portion 15", at least one through slot 14 formed according to the direction of longitudinal extension of the sheet itself and functional to a stabilization of the saddle 12 with respect to the seatpost tube 13 as detailed below; according to the embodiment shown in the figures, there are preferably two slots 14.

The sheet or leaf 12A is made of materials of the plastic, carbon fibre, carbon/kevlar, thermoplastic resin, titanium type or other suitable material for the purpose with features of lightness, high structural resistance and, as previously described, with elastic behaviour.

Figure 1:
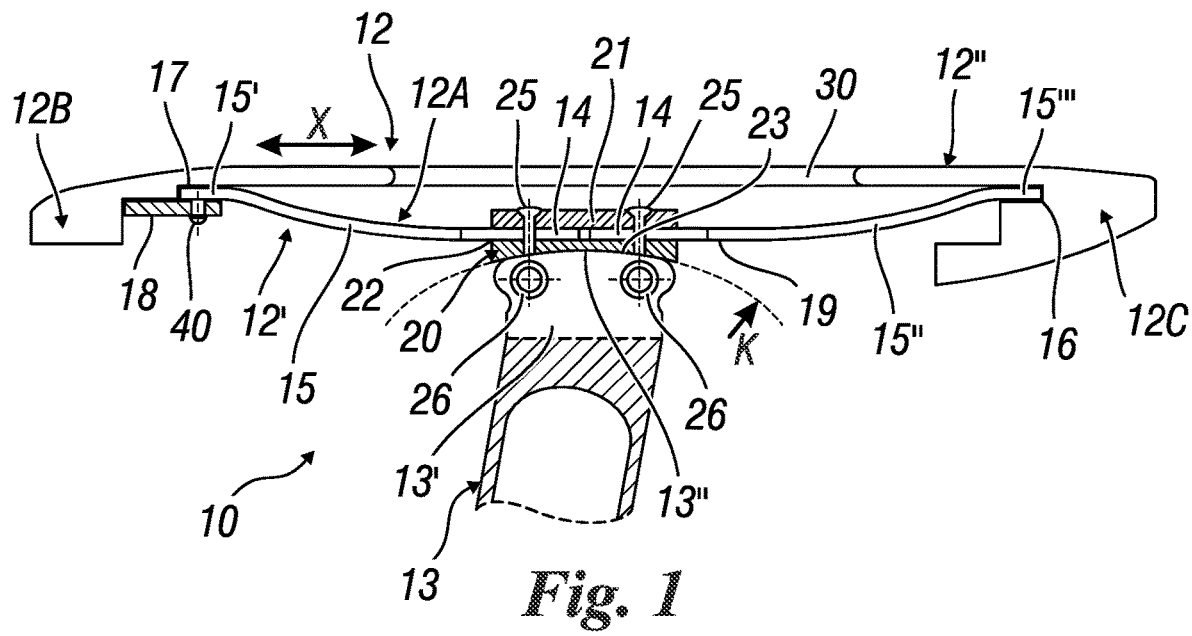
FIG. 1 schematically depicts a partially sectioned side view according to a longitudinal vertical plane of the saddle assembly for bicycles of the invention.
Figure 2:
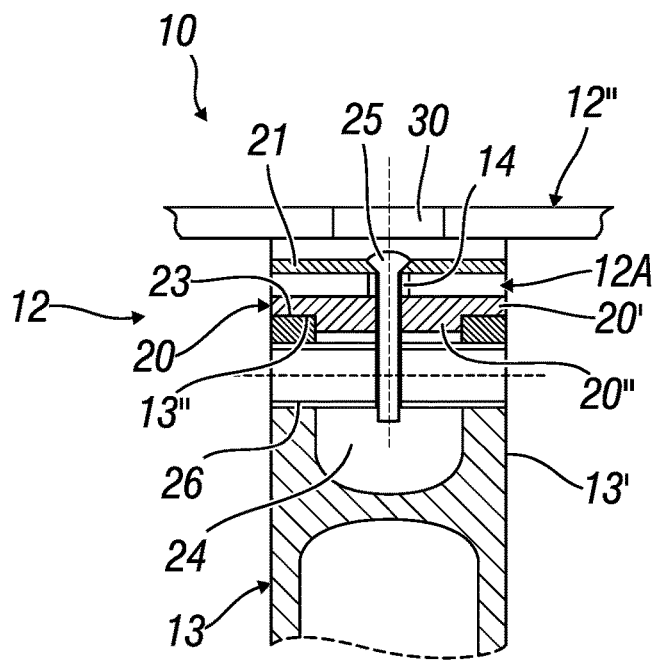
FIG. 2 schematically depicts a front view of the saddle assembly also partially sectioned according to a vertical plane perpendicular to the section plane of FIG. 1.

It is to be understood that the sheet or leaf 12A is described herein with reference to the preferred embodiment of FIGS. 1 to 3; however, the same sheet or leaf 12A can assume different shapes and thicknesses and be functional to the specific anatomical and/or performance features of the rider.

The frame 12' further comprises coupling means with the seatpost tube 13 and, in particular, with the free end 13' thereof (opposite an end connecting to the bicycle frame) having a front or edge 13" with a curvilinear profile, with said means comprising a block 20 and a washer 21 arranged at the central portion 19 of the sheet or leaf 12A with the block 20 facing the direction of the free end 13' of the seatpost tube 13 and with the washer 21 facing the direction of the hull or shield 12", the sheet or leaf 12A being in an intermediate position between said block 20 and washer 21.

The block 20 comprises a first portion 20' provided with an upper front 22 in contact with a lower front of the sheet or leaf 12A and a lower front 23, facing the direction of the free end 13' of the seatpost tube 13, which has a curvilinear profile corresponding and conjugated to a curvilinear profile of a front or edge 13" of said free end 13' and a lower portion 20" extending from said lower front 23 of the upper portion 20' to define a protruding appendage adapted to fit into a seat 24 of said seatpost tube 13.

The coupling means of the frame 12' are stabilized to the seatpost tube 13 and to the sheet or leaf 12A by means of retaining means defined by screws 25 vertically inserted in the washer 21, in the at least one slot 14 of the sheet or leaf 12A and in the block 20 and anchored to pawls 26 transversely arranged in the seatpost tube 13 at the free end 13'.

The coupling means described above have the function of locking the sheet or leaf 12A with respect to the block 20 and, at the same time, of allowing an adjustment of the position of the saddle in terms of distance with respect to a handlebar of the bicycle and of the inclination of the same with respect to a horizontal axis.

Figure 4:
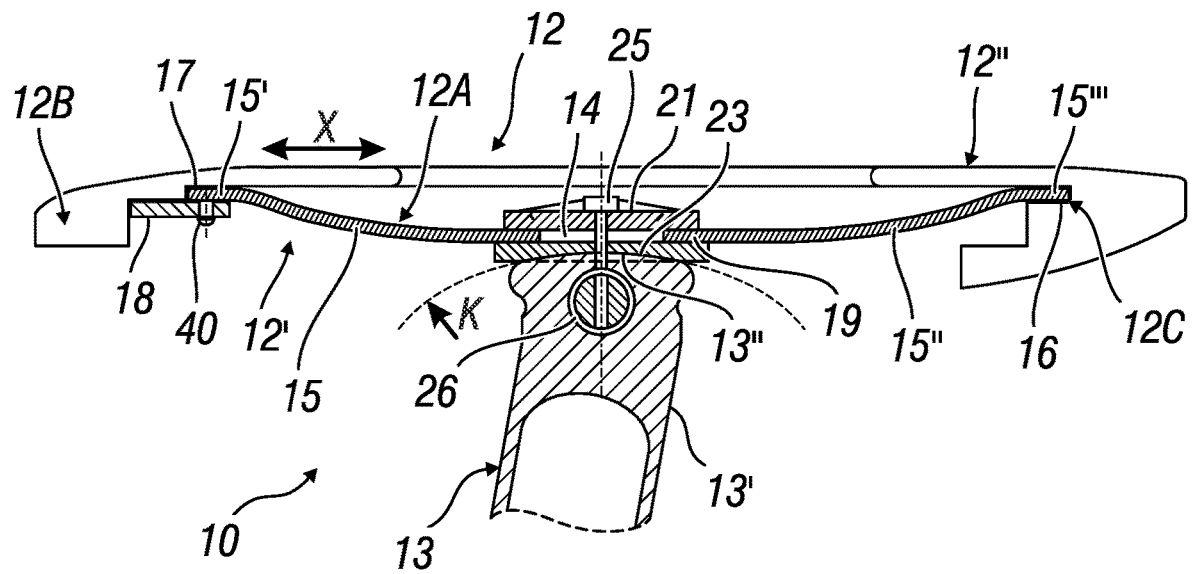
FIG. 4 schematically depicts a partially sectioned side view according to a longitudinal vertical plane of the saddle assembly for bicycles of the invention according to an alternative embodiment.

FIG. 4 illustrates an alternative embodiment of the saddle assembly described above with reference to FIGS. 1 to 3, in which the sheet or leaf 12A comprises a single slot 14, with the retaining means comprising a screw 25 vertically inserted in the washer 21, in the slot 14 of the sheet or leaf 12A and in the block 20 and anchored to a pawl 26 transversely arranged in the seatpost tube 13 at the free end 13' thereof.

Figure 5:
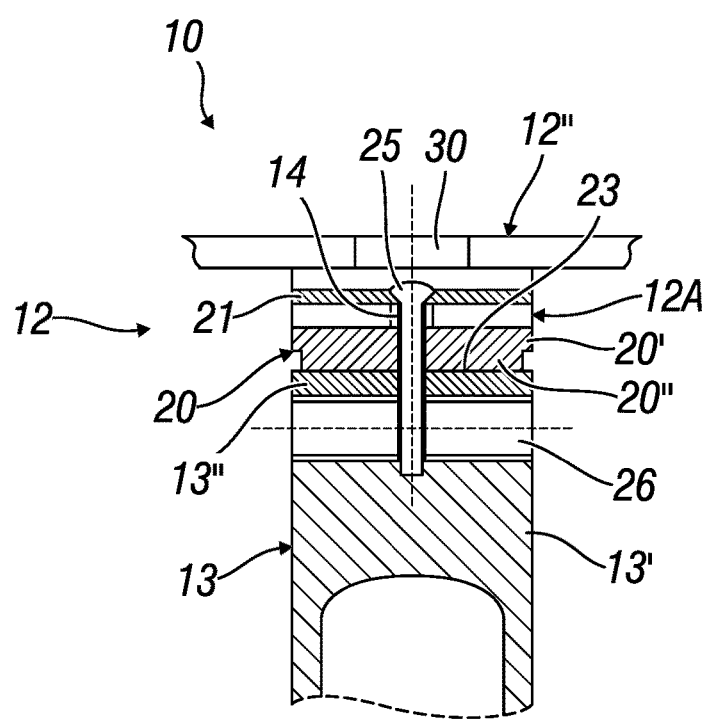
FIG. 5 schematically depicts, according to a front view of the saddle assembly, also partially sectioned according to a vertical plane referred to in the previous figures, according to an alternative embodiment.

In an alternative embodiment, the lower portion 20" of the block 20 contacts with the front or edge 13" of the free end 13' and has a contour with a shape profile corresponding and conjugated to that of the front or edge 13' (as outlined in FIG. 5) so as to allow an adjustment movement as better detailed below.

The adjustment of the position of the saddle 12 in terms of distance (approaching or moving away) with respect to the handlebar of the bicycle is implemented by acting on the screws 25 in order to loosen the tightening of the sheet or leaf 12A between the washer 21 and the block 20 to allow a horizontal sliding (indicated in the figure by arrow X) of said sheet with respect to the block and the washer by means of the at least one slot 14 of the same sheet.

The adjustment of the inclination of the saddle 12 with respect to a horizontal axis (perpendicular to the extension direction of the saddle itself) is implemented by acting on the same screws 25 which allow the tightening between the block 20 and the end 13' of the seatpost tube 13 to be loosened so as to allow a sliding (indicated in the figure by the curvilinear trajectory K) of the curvilinear profile of the lower front 23 of the first portion 20' of the block 20 with respect to the curvilinear profile of the front or edge 13" of the free end 13' of said seatpost tube.

The action of loosening the screws 25 is carried out from the top of the saddle 12, i.e., from an upper front of the hull or shield 12" where, typically, there is a central channel 30 with longitudinal extension along the median line of the saddle (called "love channel" in jargon) functional to a reduction of the pressures on the rider's soft tissues.

As can be seen from the above, the advantages obtained by the saddle assembly of the invention are clear.

The saddle assembly for bicycles of the present invention advantageously allows to ensure a greater robustness and a structural rigidity of the saddle assembly itself with respect to those of the saddles of a known type by virtue of the presence of the sheet which, by virtue of the better structural features and the described mechanical behaviour thereof, supports the hull or shield of the saddle (unlike the more structurally fragile rods).

A further advantage is that the sheet of the frame of the saddle assembly of the invention, shaped as a guide of a sheet or leaf of a leaf spring and by virtue of the elastic behaviour thereof, allows to ensure, in total safety, a cushioning effect to stresses on the saddle (a consequent advantage for the rider) and, therefore, does not require substantial padding of the hull or shield cover.

A further advantage is that the absence of rods ensures a high safety level for riders, since the danger of a breakage of the rods to which the saddle is stabilized as indicated above with reference to the traditional systems is avoided.

Further advantageous is the fact that the saddle assembly of the invention allows a simple and easy adjustment of the position of the saddle both with reference to the distance with respect to the handlebar and with reference to the inclination with respect to the same with said adjustments implemented simply by acting on the retaining means (the screws) defining the stabilization of the sheet with respect to the connecting means and the connecting means with respect to the seatpost tube; therefore, the saddle assembly of the invention defines an ease of adjustment of the saddle position even by inexperienced persons.

A further advantage of the saddle assembly of the invention is that, with the same weight and size of the saddle assembly, for the shape and structure of the assembly, it defines a greater torsional stiffness and a high resistance to impact and this entails, as a consequence, the possibility of using light and performing composite materials which could not be used in the traditional assemblies due to the structural problems described.

Further advantageous is the fact that the saddle assembly of the invention, by virtue of the use of the sheet or leaf of the support frame, with said leaf or sheet which is not to be replaced in the event of a saddle change, allows to make saddles with more sophisticated and sought-after shapes than the traditional saddles and, also, to make wider or narrower or longer or shorter saddles according to specific needs and without the constraint of dimensional encumbrance of the traditional rods and without the need to change the entire saddle assembly, considering the fact that only the saddle will be changed and not the entire block defined by the saddle, support frame and seatpost tube.

A further advantage of the saddle assembly of the invention is that it is easy, simple and inexpensive to maintain.

A further and not indifferent advantage of the present invention is that the saddle assembly described allows to take into account the physicality of the rider and the ergonomic problems related to the anatomical differences between riders and between men and women for optimal support in all conditions; in fact, by virtue of the features described, the problem related to rubbing abrasions is avoided which, typically, affect the upper inner part of the thigh of riders (tending to be very developed from a muscular point of view) and which are linked to the presence of the rod locking clamps to which the saddle is traditionally fixed (it should be noted that in traditional saddle assemblies, the rods—in terms of size and centre distance—and the locking clamps thereof have standard dimensions independent of the size of the saddle and, consequently, in the case of using saddles with a particularly narrow hull, the rubbing problem is further felt and highlighted) against which the thighs of the rider rub and, moreover, it allows to take into account the different support conditions of the bones of men and women.

Although the present invention has been described above with particular reference to embodiments given only by way of non-limiting example, numerous modifications and variations will be apparent to a person skilled in the art in the light of the above description. Therefore, the present invention intends to embrace all the modifications and variations which fall within the scope of the following claims.

The invention claimed is:

1. A saddle assembly (10) for bicycles comprising a saddle (12) and means for stabilizing and supporting said saddle at one end (13') of a seatpost tube (13) of the bicycle and characterized in that the saddle (12) comprises a hull or shield (12") defining a seat for a rider, with said hull or shield (12") supported by a support frame (12') comprising a sheet or leaf (12A) of elastic type, extending longitudinally and comprising, in a vertical plane, a curvilinear profile, with said sheet or leaf being removably stabilized at the hull or shield (12") at a front end (12B) thereof and at an opposite rear end (12C) thereof, and being stabilized to the seatpost tube (13) by means for coupling said sheet or leaf (12A) comprising means for adjusting the distance of the saddle (12) closer/farther with respect to a handlebar of the bicycle and by means for adjusting the inclination of the same saddle (12) with respect to a horizontal plane, said means comprising a block (20) and a washer (21) arranged at a central portion (19) of the sheet or leaf (12A), the block (20) facing the direction of a free end (13') of the seatpost tube (13) opposite a connection end to a bicycle frame and the washer (21) facing the direction of the hull or shield (12"), the sheet or leaf (12A) being in the intermediate position between said block (20) and washer (21), said coupling means being stabilized to the seatpost tube (13) through retaining means defined by at least one screw (25) vertically inserted in the washer (21), in the at least one slot (14) of the sheet (12A) and in the block (20) and anchored to at least one elongated retainer (26) extending transversely to a longitudinal axis of the seatpost tube (13) at the free end (13'), said at least one screw (25) serving for a tightening/loosening of the sheet or leaf (12A) between the block (20) and the washer (21) for a horizontal movement of the sheet or leaf (12A) closer/farther with respect to the handlebar and to an enabling/disabling of the sliding of the block (20) in contact with the profile of the free end (13') of the seatpost tube (13) for an adjustment of the inclination of the saddle (12).

2. The saddle assembly according to claim 1, characterized in that the sheet or leaf (12A) comprises a front portion (15) facing the front end (12B) of the hull or shield (12"), a rear portion (15") facing the rear end (12C) of said hull or shield (12") and a central portion (19) intermediate between the front portion (15) and the rear portion (15") and comprising at least one slot (14) of the through-type formed in the thickness of the sheet or leaf (12A) and extending according to the longitudinal direction of extension of the same sheet, said at least one slot (14) serving for the stabilization of the saddle (12) with respect to the seatpost tube (13) and to an adjustment of the distance thereof with respect to the handlebar.

3. The saddle assembly according to claim 1, characterized in that the hull or shield (12") comprises a seat or pocket (16) for inserting an end (15"') of the rear portion (15") of the sheet or leaf (12A) formed at the rear end (12C) and a further seat defined by rails or channels (17) formed at the front end (12B) for a sliding coupling with lateral edges of the end (15') of the front portion (15) of the sheet or leaf (12A).

4. The saddle assembly according to claim 3, characterized in that it comprises a removable plate or lid (18) for a stabilization of the front end (15') of the front portion (15) of the sheet or leaf (12A) with respect to the rails or channels (17) of the hull or shield (12").

5. The saddle assembly according to claim 1, characterized in that the block (20) comprises a first portion (20') provided with an upper front (22) in contact with a lower front of the sheet or leaf (12A) and a lower front (23), facing the direction of the free end (13') of the seatpost tube (13) and provided with a curvilinear profile corresponding and conjugated to a curvilinear profile of a front or edge (13") of said free end (13'), and a lower portion (20") extending from said lower front (23) of the upper portion (20') to define a protruding appendage adapted to fit into a seat (24) of said seatpost tube (13).

6. The saddle assembly according to claim 1, characterized in that the block (20) comprises a first portion (20') provided with an upper front (22) in contact with a lower front of the sheet or leaf (12A) and a lower front (23), facing the direction of the free end (13') of the seatpost tube (13), from which a lower portion (20") extends provided with a curvilinear profile corresponding and conjugated to a curvilinear profile of a front or edge (13") of said free end (13').

\* \* \* \* \*